US012533369B2

(12) United States Patent
McConnell et al.

(10) Patent No.: US 12,533,369 B2
(45) Date of Patent: Jan. 27, 2026

(54) MIXTURE OF HMOS FOR IMPROVING THE MICROBIOTA OF PREGNANT WOMEN

(71) Applicant: Glycom A/S, Hørsholm (DK)

(72) Inventors: Bruce McConnell, La Tour de Peilz (CH); Louise Kristine Vigsnæs, Copenhagen NV (DK); Dorthe Seitzberg, Espergærde (DK); Ingvild Dybdrodt Amundsen, Copenhagen S (DK); Buket Soyyilmaz, Istanbul (TR)

(73) Assignee: Glycom A/S, Hørsholm (DK)

( * ) Notice: Subject to any disclaimer, the term of this patent is extended or adjusted under 35 U.S.C. 154(b) by 842 days.

(21) Appl. No.: 17/780,390

(22) PCT Filed: Nov. 30, 2020

(86) PCT No.: PCT/IB2020/061258
§ 371 (c)(1),
(2) Date: May 26, 2022

(87) PCT Pub. No.: WO2021/105964
PCT Pub. Date: Jun. 3, 2021

(65) Prior Publication Data
US 2023/0012011 A1    Jan. 12, 2023

(30) Foreign Application Priority Data

Nov. 29, 2019 (DK) .............................. PA201901402

(51) Int. Cl.
| A61K 31/702 | (2006.01) |
| A23L 33/00 | (2016.01) |
| A23L 33/125 | (2016.01) |
| A61P 1/00 | (2006.01) |
| A61P 17/00 | (2006.01) |
| A61P 37/00 | (2006.01) |

(52) U.S. Cl.
CPC .......... *A61K 31/702* (2013.01); *A23L 33/125* (2016.08); *A23L 33/40* (2016.08); *A61P 1/00* (2018.01); *A61P 17/00* (2018.01); *A61P 37/00* (2018.01); *A23V 2002/00* (2013.01)

(58) Field of Classification Search
None
See application file for complete search history.

(56) References Cited

FOREIGN PATENT DOCUMENTS

| CN | 101420966 A | 4/2009 | |
| CN | 108289492 A | 7/2018 | |
| EP | 2388010 A1 * | 11/2011 | ............ A23L 33/115 |
| EP | 3335576 A1 | 6/2018 | |
| WO | 0104341 A1 | 1/2001 | |
| WO | 2007101862 A1 | 9/2007 | |
| WO | 2010100979 A1 | 9/2010 | |
| WO | 2010115934 A1 | 10/2010 | |
| WO | 2010115935 A1 | 10/2010 | |
| WO | 2011100980 A1 | 8/2011 | |
| WO | 2012007588 A1 | 1/2012 | |
| WO | 2012113404 A1 | 8/2012 | |
| WO | 2012113405 A1 | 8/2012 | |
| WO | 2012127410 A1 | 9/2012 | |
| WO | 2012155916 A1 | 11/2012 | |
| WO | 2012156897 A1 | 11/2012 | |
| WO | 2012156898 A1 | 11/2012 | |
| WO | 2013044928 A1 | 4/2013 | |
| WO | 2013091660 A1 | 6/2013 | |
| WO | 2013139344 A1 | 9/2013 | |
| WO | 2016043583 A1 | 3/2016 | |
| WO | 2018215406 A1 | 11/2018 | |
| WO | 2019111115 A2 | 6/2019 | |

OTHER PUBLICATIONS

Phipps, Kirt R., et al. "Safety evaluation of a mixture of the human-identical milk oligosaccharides 2'-fucosyllactose and difucosyllactose." Food and Chemical Toxicology 120 (2018): 552-565.*
Hirschmugl, B. et al., "Evidence of Human Milk Oligosaccharides in Cord Blood and Maternal-to-Fetal Transport across the Placenta," In: Nutrients, 2019, vol. 11, Published Nov. 4, 2019, pp. 1-14.
Jantscher-Krenn E. et al., "Evidence of human milk oligosaccharides in maternal circulation already during pregnancy: a pilot study," In: Am. J. Physiol. Endocrinol Metab., Published Nov. 13, 2018, pp. 1-11.
Wise A. et al., "Infants Are Exposed to Human Milk Oligosaccharides Already in utero," In: Frontiers in Pediatrics, Published Oct. 2, 2018, pp. 1-4.
Shadid et al., "Effects of galactooligosaccharide and long-chain fructooligosaccharide supplementation during pregnancy on maternal and neonatal microbiota and immunity—a randomized, double-blind, placebo-controlled study.", Am J Clin Nutr. Nov. 2007;86(5): 1426-37. doi: 10.1093/ajcn/86.5.1426. PMID: 17991656, pp. 1-12.
Garcia-Larsen et al., "Diet during pregnancy and infancy and risk of allergic or autoimmune disease: A systematic review and meta-analysis", PLoS Med 15(2): e1002507. https://doi.org/10.1371/journal.pmed.1002507, Feb. 2018, pp. 1-25.
Iacovou et al., "Randomised clinical trial: reducing the intake of dietary FODMAPs of breastfeeding mothers is associated with a greater improvement of the symptoms of infantile colic than for a typical diet", Aliment Pharmacol Ther. 2018;48:1061-1073. wileyonlinelibrary.com/journal/apt, pp. 1-13.
Duranti et al., "Exploration of the Genomic Diversity and Core Genome of the Bifidobacterium adolescentis Phylogenetic Group by Means of a Polyphasic Approach", aem.asm.org Applied and Environmental Microbiology p. 336-346 Jan. 2013 vol. 79 No. 1, pp. 1-11.

(Continued)

*Primary Examiner* — Patrick T Lewis
(74) *Attorney, Agent, or Firm* — Kunzler Bean & Adamson; Thomas D Briscoe

(57) ABSTRACT

The invention relates to a human milk oligosaccharide (HMO) for use in supplementing the diet of a pregnant woman, a synthetic composition comprising an HMO for use in supplementing the diet of a pregnant woman, and a method for improving health outcomes in an infant by supplementing the diet of a pregnant woman.

14 Claims, No Drawings

(56) References Cited

OTHER PUBLICATIONS

Bottacini et al., "Diversity, ecology and intestinal function of bifidobacteria", Microbial Cell Factories 2014, 13(Suppl 1):S4 http://www.microbialcellfactories.com/content/13/S1/S4, pp. 1-15.

Urashima et al., "Physiology of Consumption of Human Milk Oligosaccharides by Infant Gut-associated Bifidobacteria", The Journal of Biological Chemistry vol. 286, No. 40, Oct. 7, 2011, pp. 1-10.

Chen, "Human Milk Oligosaccharides (HMOS): Structure, Function, and Enzyme-Catalyzed Synthesis", Adv Carbohydr Chem Biochem. 2015 ; 72: 113-190. doi: 10.1016/bs.accb.2015.08.002, pp. 1-59.

G.R. Gibson et al., "The International Scientific Association for Probiotics and Prebiotics (ISAPP) consensus statement on the definition and scope of prebiotics", Nature Reviews | Gastroenterology & Hepatology, vol. 14, Aug. 2017, pp. 491-502.

A. Rousseaux et al., "Human Milk Oligosaccharide Supplementation During Gestation Induces a Tolerogenic Environment in Offspring Protecting From Food Allergy", INRAE Nantes, UR1268 BIA équipe Allergie, (2022), p. 1.

\* cited by examiner

MIXTURE OF HMOS FOR IMPROVING THE MICROBIOTA OF PREGNANT WOMEN

CROSS-REFERENCE TO RELATED APPLICATIONS

This application is a National Stage Entry under 35 U.S.C. § 371 of International Application PCT/IB2020/061258 filed on Nov. 30, 2020, which claims priority to the following application: DK PA 201901402 filed on Nov. 29, 2019, the entirety of each of which are incorporated herein by reference to the extent permitted by applicable patent laws and rules.

FIELD OF THE INVENTION

This invention relates to a method, compounds and a composition for improving the microbiota and health of pregnant women, and of their infants.

BACKGROUND OF THE INVENTION

The commensal intestinal microbiota plays an important role in health of neonates, contributing to development of the gut barrier function and immune system and protecting against infections. Colonisation of the neonatal intestine starts immediately at birth and is influenced by the mode of delivery, the maternal microbiota, and whether the infant is breast fed or formula fed. Because of the impact the intestinal microbiota has on the health of the infant, several approaches have been adopted to modulate the microbiota, particularly by altering the composition of infant formula. For example, infant formula has been supplemented with probiotic bacteria, mostly bifidobacteria and lactobacilli, or prebiotics which serve as selective substrates for the intestinal microbiota. Initially the prebiotics were in the form of fructooligosaccharides (FOS) and galactooligosaccharides (GOS), substances which are not present in human milk. However, synthetically produced human milk oligosaccharides (HMOs) have started to become commercially available and are now being included in infant formula, particularly 2'-fucosylated lactose (2'-FL) and lacto-N-neotetraose (LNnT).

An alternative approach that has been proposed is the supplementation of pregnant women with prebiotics or probiotics (Shadid et al. Am. J. Clin. Nutr. 86, 1426 (2007)). The idea is that the prebiotics and probiotics would produce changes in the maternal intestinal microbiota and that this may help increase colonisation of beneficial bacteria in the infant at delivery. Also, improvement of the maternal health may lead to better health outcomes in the infant. For example, there is evidence that the likelihood of neurodevelopmental disorders (e.g., schizophrenia, autism spectrum disorder and cerebral palsy) is increased by disruptions in the in-utero environment. In particular, maternal inflammation during pregnancy is believed to play a role in the pathogenesis of these conditions. Maternal immune activation can be defined as levels of inflammatory markers in the higher normal range or exceeding the normal range. Infection, psychosocial stress, maternal psychopathology, allergies and high body mass index are common conditions associated with inflammatory states during pregnancy that, in turn, have been associated with increased rates of impaired neurodevelopment. A disruption in homeostasis by imbalance in the expression of inflammation-related factors such as interleukin 6 (IL-6), interleukin 1α (IL-1α), interleukin 10 (IL-10), interleukin 27 (IL-27), tumour necrosis factor α (TNFα), C-reactive protein (CRP) or the complement system may play a role.

To date, these approaches have been partially successful but with conflicting results. A meta-analysis has shown an association between probiotic supplementation of the mother and reduced eczema in the infant, but not between prebiotic supplementation and reduced eczema (Garcia-Larsen et al. *PLoS Med.* 15, e1002507 (2018)). Further a mixture of GOS and long-chain FOS modulated the maternal microbiota but not that of the later born infant (Shadid et al. *Am. J. Clin. Nutr.* 86, 1426 (2007)). Similarly, FOS fed to pregnant women increased the abundance of bifidobacteria in the faeces of the women but no impact on the microbiota of the infants could be determined. In another trial, pregnant women were fed a low-FODMAP ((Fermentable Oligosaccharides, Disaccharides, Monosaccharides And Polyols)) diet during pregnancy (Iacovou et al. *Aliment. Pharmacol. Ther.* 1 (2018)). A low-FODMAP diet by definition excludes prebiotics. Infants born to the mothers consuming the low-FODMAP diet indicated enhanced reduction in crying-fussing durations of infants with colic than those born to mothers consuming a normal diet. Maternal psychological status, breast milk content and infant faecal microbiota were not distinguishable between the two diets.

Therefore, there remains a need for methods and compounds for improving the microbiota and health of pregnant women, especially immune health, and in consequence the health of their infants.

SUMMARY OF THE INVENTION

A first aspect of the invention relates to a human milk oligosaccharide (HMO) for use in supplementing the diet of a pregnant woman:
   for promoting the development of a balanced immune system in an unborn infant,
   for promoting the normal development of the brain in an unborn infant,
   for promoting the development of a healthy gastrointestinal system in an infant later born to the woman,
   for reducing the severity and/or occurrence of immune related disorders in an infant later born to the woman,
   for reducing the severity and/or occurrence of neurodevelopmental disorders in an infant later born to the woman, and/or
   for reducing the severity and/or occurrence of functional gastrointestinal disorders in an infant later born to the woman.

A second aspect of the invention relates to an enteral composition for use in supplementing the diet of a pregnant woman:
   for promoting the development of a balanced immune system in an unborn infant,
   for promoting the normal development of the brain in an unborn infant,
   for promoting the development of a healthy gastrointestinal system in an infant later born to the woman,
   for reducing the severity and/or occurrence of immune related disorders in an infant later born to the woman,
   for reducing the severity and/or occurrence of neurodevelopmental disorders in an infant later born to the woman, and/or
   for reducing the severity and/or occurrence of functional gastrointestinal disorders in an infant later born to the woman, the composition comprising at least one human milk oligosaccharide (HMO).

Preferably the synthetic composition contains an amount of 1 g to 15 g of the HMO; more preferably 2 g to 10 g. For example, the synthetic composition may contain 3 g to 7 g of the HMO.

The synthetic composition may contain a bifidobacteria; for example, *Bifidobacterium longum* and/or *Bifidobacterium bifidum*.

A third aspect of the invention relates a pack for use in supplementing the diet of a pregnant woman:
for promoting the development of a balanced immune system in an unborn infant,
for promoting the normal development of the brain in an unborn infant,
for promoting the development of a healthy gastrointestinal system in an infant later born to the woman,
for reducing the severity and/or occurrence of immune related disorders in an infant later born to the woman,
for reducing the severity and/or occurrence of neurodevelopmental disorders in an infant later born to the woman, and/or
for reducing the severity and/or occurrence of functional gastrointestinal disorders in an infant later born to the woman,
the pack comprising at least 14 individual daily doses of an effective amount of at least one human milk oligosaccharide (HMO).

Preferably each dose in the pack contains about 1 g to 15 g of the human milk oligosaccharide, preferably 2 g to 10 g, more preferably 3 g to 7 g.

The pack preferably comprises at least about 21 daily doses; for example, about 28 daily doses.

The pack may contain a bifidobacteria; for example, *Bifidobacterium longum* and/or *Bifidobacterium bifidum*.

A fourth aspect of the invention relates to a method for promoting the development of a balanced immune system in an unborn infant, the method comprising administering to a pregnant woman an effective amount of at least one human milk oligosaccharide (HMO).

A fifth aspect of the invention relates to a method for promoting the normal development of the brain in an unborn infant, the method comprising administering to a pregnant woman an effective amount of at least one human milk oligosaccharide (HMO).

A sixth aspect of the invention relates to a method for promoting the development of a healthy gastrointestinal system in an infant, the method comprising administering to a pregnant woman an effective amount of at least one human milk oligosaccharide (HMO).

A seventh aspect of the invention relates to a method for reducing the severity and/or occurrence of immune related disorders in an infant, the method comprising administering to a pregnant woman an effective amount of at least one human milk oligosaccharide (HMO).

The immune related disorders can be allergy-related disorders, autoimmune disorders such as coeliac disease, and the like.

An eighth aspect of the invention relates to a method for reducing the severity and/or occurrence of neurodevelopmental disorders in an infant, the method comprising administering to a pregnant woman an effective amount of at least one human milk oligosaccharide (HMO).

The neurodevelopmental disorders can be schizophrenia, autism spectrum disorder, cerebral palsy and the like.

A ninth aspect of the invention relates to a method for reducing the severity and/or occurrence of functional gastrointestinal disorders in an infant, the method comprising administering to a pregnant woman an effective amount of at least one human milk oligosaccharide (HMO).

The functional gastrointestinal disorders can be infantile colic, regurgitation and the like.

The amount of the HMO administered is preferably effective to increase the abundance of butyrate-producing bacteria and/or bifidobacteria in the intestine of the pregnant woman. Further, the amount of the HMO administered is preferably effective to improve the intestinal barrier properties of the pregnant woman, particularly in the colon.

Preferably the pregnant woman is administered an amount of 1 g to 15 g per day of the HMO; more preferably 2 g to 10 g per day. For example, the pregnant woman may be administered 3 g to 7 g per day. Preferably the pregnant woman is administered the HMO for a period of at least 1 week; more preferably for at least 2 weeks.

Preferably the pregnant woman is administered the HMO during the third trimester of pregnancy; more preferably on a daily basis during the third trimester of pregnancy. The pregnant woman may also be administered the HMO during the first and/or second trimester of pregnancy.

The pregnant woman may be administered a higher dose during an initial phase and a lower dose during a maintenance phase. Preferably the pregnant woman is administered the HMO for a period of at least 1 week; more preferably for at least 2 weeks during the initial phase. The pregnant woman may be administered the HMO for a period of at least 4 weeks; more preferably for at least 8 weeks during the maintenance phase. The dose administered during an initial phase is preferably about 3 g to about 10 g per day (for example about 4 g to about 7.5 g per day) and the dose administered during a maintenance phase is preferably about 2 g to about 7.5 g per day (for example about 2 g to about 5 g per day).

In certain embodiments, the HMO can be a neutral HMO or an acidic HMO. The neutral HMO can be one or more fucosylated HMOs or one or more non-fucosylated HMOs. Preferably the HMO is selected from 2'-FL, 3-FL, DFL, LNT, LNnT, 3'-SL, 6'-SL, LNFP-I or a mixture thereof. Preferably the HMO comprises 2'-FL and at least one of LNnT and LNT; at least one of 2'-FL and DFL and at least one of LNnT and LNT (e.g. 2'-FL, DFL and at least one of LNnT and LNT); 2'-FL and 6'-SL; DFL and 6'-SL; 2'-FL, DFL and 6'-SL; 2'-FL, 6'-SL and at least one of LNnT and LNT; and 2'-FL, DFL, 6'-SL and at least one of LNnT and/or LNT.

DETAILED DESCRIPTION OF THE INVENTION

It has now been surprisingly found that enteral administration of one or more human milk oligosaccharides (HMOs) to a pregnant woman is beneficial to the health of her later born infant. In particular, the development of a balanced immune system, a normally functioning brain and a healthy gastrointestinal system is promoted in the infant later born to the woman. This leads to a reduction in immune related disorders, neurodevelopmental disorders, and/or functional gastrointestinal disorders in the infant. Further, the administration of the HMOs has a beneficial impact on the health of the pregnant woman by improving her digestion, softening stools, reducing inflammation, and reducing perception of fatigue.

The HMOs also preferentially increase the abundance of bifidobacteria in the gastro-intestinal tract of the pregnant woman, in particular bifidobacteria of the *B. adolescentis* phylogenetic group, *Bifidobacterium longum* and/or *Bifidobacterium bifidum*. The *Bifidobacterium longum* can be a *Bifidobacterium longum longum* or a *Bifidobacterium longum infantis*. These bacteria produce short-chain fatty acids such as lactate and acetate which in turn can be converted into butyrate by butyrate-producing bacteria. The increase in short chain fatty acids improves digestive health and nourishes the intestinal barrier. A poor intestinal barrier may be a cause of immune activation in the pregnant woman.

In this specification, the following terms have the following meanings:

A "balanced immune system" means a functioning immune system which is able to support appropriate immune responses when presented with threats and which has appropriate regulatory responses when activated.

"*Bifidobacterium* of the *B. adolescentis* phylogenetic group" means a bacterium selected from a group consisting of *Bifidobacterium adolescentis, Bifidobacterium angulatum, Bifidobacterium catenulatum, Bifidobacterium pseudocatenulatum, Bifidobacterium kashiwanohense, Bifidobacterium dentum* and *Bifidobacterium stercoris* (Duranti et al. *Appl. Environ. Microbiol.* 79, 336 (2013), Bottacini et al. *Microbial Cell Fact.* 13:S4 (2014)). Preferably, a *Bifidobacterium* of the *B. adolescentis* phylogenetic group is *Bifidobacterium adolescentis* and/or *Bifidobacterium pseudocatenulatum*.

"Effective amount" means an amount of an HMO sufficient to render a desired outcome in a human. An effective amount can be administered in one or more doses to achieve the desired outcome.

"Enteral administration" means any conventional form for delivery of a composition to a patient that causes the deposition of the composition in the gastrointestinal tract (including the stomach). Methods of enteral administration include feeding through a naso-gastric tube or jejunum tube, oral, sublingual and rectal.

A "functional gastrointestinal disorder" means an abdominal complaint, usually chronic, without a structural or biochemical cause that could explain the symptoms. Symptoms usually involve visceral sensitivity and/or abnormal gut motility. In infants, common functional gastrointestinal disorders include regurgitation, infant colic, functional constipation, functional diarrhoea, cyclic vomiting syndrome, infant dyschezia, and infant rumination syndrome. They may also be referred to as disorders of gut-brain interactions.

"Human milk oligosaccharide" or "HMO" means a complex carbohydrate found in human breast milk (Urashima et al.: Milk Oligosaccharides. Nova Science Publisher (2011); Chen *Adv. Carbohydr. Chem. Biochem.* 72, 113 (2015)). The HMOs have a core structure comprising a lactose unit at the reducing end that can be elongated by one or more β-N-acetyl-lactosaminyl and/or one or β-more lacto-N-biosyl units, and which core structure can be substituted by an α L-fucopyranosyl and/or an α-N-acetyl-neuraminyl (sialyl) moiety. In this regard, the non-acidic (or neutral) HMOs are devoid of a sialyl residue, and the acidic HMOs have at least one sialyl residue in their structure. The non-acidic (or neutral) HMOs can be fucosylated or non-fucosylated. Examples of such neutral non-fucosylated HMOs include lacto-N-tetraose (LNT), lacto-N-neotetraose (LNnT), lacto-N-neohexaose (LNnH), para-lacto-N-neohexaose (pLNnH), para-lacto-N-hexaose (pLNH) and lacto-N-hexaose (LNH). Examples of neutral fucosylated HMOs include 2'-fucosyl-lactose (2'-FL), lacto-N-fucopentaose I (LNFP-I), lacto-N-difucohexaose I (LNDFH-I), 3-fucosyllactose (3-FL), difucosyllactose (DFL), lacto-N-fucopentaose II (LNFP-II), lacto-N-fucopentaose III (LNFP-III), lacto-N-difucohexaose III (LNDFH-III), fucosyl-lacto-N-hexaose II (FLNH-II), lacto-N-fucopentaose V (LNFP-V), lacto-N-difucohexaose II (LNDFH-II), fucosyl-lacto-N-hexaose I (FLNH-I), fucosyl-para-lacto-N-hexaose I (FpLNH-I), fucosyl-para-lacto-N-neohexaose II (FpLNnH II) and fucosyl-lacto-N-neohexaose (FLNnH). Examples of acidic HMOs include 3'-sialyllactose (3'-SL), 6'-sialyllactose (6'-SL), 3-fucosyl-3'-sialyllactose (FSL), LST a, fucosyl-LST a (FLST a), LST b, fucosyl-LST b (FLST b), LST c, fucosyl-LST c (FLST c), sialyl-LNH (SLNH), sialyl-lacto-N-hexaose (SLNH), sialyl-lacto-N-neohexaose I (SLNH-I), sialyl-lacto-N-neohexaose II (SLNH-II) and disialyl-lacto-N-tetraose (DSLNT).

An "immune-related disorder" means a disorder caused by a dysfunction of the immune system leading to an abnormal immune response to a normal body part or to an abnormal immune reaction to a normally harmless antigen. Common examples of abnormal immune response to a normal body part are diseases such as Lupus, Type one diabetes, Graves disease, Rheumatoid arthritis, and intestinal bowel disease. Common examples of an abnormal immune reaction to a normally harmless antigen include seasonal allergies, food allergies, allergic rhinitis and atopic dermatitis.

"Microbiota", "microflora" and "microbiome" mean a community of living microorganisms that typically inhabits a bodily organ or part, particularly the gastro-intestinal organs of humans. The most dominant members of the gastrointestinal microbiota include microorganisms of the phyla of Firmicutes, Bacteroidetes, Actinobacteria, Proteobacteria, Synergistetes, Verrucomicrobia, Fusobacteria, and Euryarchaeota; at genus level *Bacteroides, Faecalibacterium, Bifidobacterium, Roseburia, Alistipes, Collinsella, Blautia, Coprococcus, Ruminococcus, Eubacterium* and *Dorea*; at species level *Bacteroides uniformis, Alistipes putredinis, Parabacteroides merdae, Ruminococcus bromii, Dorea longicatena, Bacteroides caccae, Bacteroides thetaiotaomicron, Eubacterium hallii, Ruminococcus torques, Faecalibacterium prausnitzii, Ruminococcus lactaris, Collinsella aerofaciens, Dorea formicigenerans, Bacteroides vulgatus* and *Roseburia intestinalis*. The gastrointestinal microbiota includes the mucosa-associated microbiota, which is located in or attached to the mucous layer covering the epithelium of the gastrointestinal tract, and luminal-associated microbiota, which is found in the lumen of the gastrointestinal tract.

"Modulating of microbiota" means exerting a modifying or controlling influence on microbiota, for example an influence leading to an increase in the indigenous intestinal abundance of *Bifidobacterium, Bamesiella, Faecalibacterium* and/or other butyrate producing bacteria. In another example, the influence may lead to a reduction of the intestinal abundance of *Ruminococcus gnavus* and/or Proteobacteria. "Proteobacteria" are a phylum of Gram-negative bacteria and include a wide variety of pathogenic bacteria, such as *Escherichia, Salmonella, Vibrio, Helicobacter, Yersinia* and many other notable genera.

A "neurodevelopmental disorder" means a disorder which affects the development of the nervous system, leading to abnormal brain function. This may affect emotion, learning ability, self-control, behaviour and memory. Common neurodevelopmental disorders include intellectual disability, learning disorders such as dyslexia or dyscalculia, autism spectrum disorders such as Asperger's syndrome or autism, cerebral palsy, behavioural disorders such as schizophrenia.

"Normal brain development" means the process through which the unborn infant's brain develops during pregnancy through neurogenesis and gliogenesis, multiplication and migration of neurons and glia, neuron branching, formulation of functional and efficient synapses, neuron pruning, and myelination to result in a normally functioning central nervous system at birth.

"Oral administration" means any conventional form for the delivery of a composition to a human through the mouth. Accordingly, oral administration is a form of enteral administration.

"Preventive treatment" or "prevention" in the present context means treatment given or action taken to diminish the risk of onset or recurrence of a disease.

"Prophylactically reducing symptom severity and/or occurrence" means reducing the severity and/or occurrence of symptoms at a later point in time.

"Relative abundance of a bifidobacteria" means the abundance of a bifidobacteria species relative to other bifidobacteria in the microbiota of the gastro-intestinal tract of humans.

"Relative growth of a bifidobacteria" means the growth of a *Bifidobacterium* species relative to other bifidobacteria in the microbiota in the gastro-intestinal tract of humans.

"Secondary prevention" means prevention of onset of the condition in a high-risk patient, or prevention of reoccurrence of symptoms in a patient who has already has the condition. A "high-risk" patient is an individual who is predisposed to developing the condition; for example, a person with a family history of the condition.

"Synthetic composition" means a composition which is artificially prepared and preferably means a composition containing at least one compound that is produced ex vivo chemically and/or biologically, e.g. by means of chemical reaction, enzymatic reaction or recombinantly. In some embodiments, a synthetic composition of the invention may be, but preferably is not, identical with a naturally occurring composition. The synthetic composition typically comprises one or more compounds, including one or more HMOs, that, when administered to a pregnant woman, are capable of promoting the development of a balanced immune system in an unborn infant, promoting the normal development of the brain in an unborn infant, promoting the development of a healthy gastrointestinal system in an infant later born to the woman, reducing immune related disorders in an infant later born to the woman, reducing neurodevelopmental disorders in an infant later born to the woman, and/or for reducing functional gastrointestinal disorders in an infant later born to the woman. Also, in some embodiments, the synthetic compositions may comprise one or more nutritionally or pharmaceutically active components which do not affect adversely the efficacy of the above-mentioned compounds. Some non-limiting embodiments of a synthetic composition of the invention are also described below.

"Treat" means to address a medical condition or disease with the objective of improving or stabilising an outcome in the person being treated or addressing an underlying nutritional need. Treat therefore includes the dietary or nutritional management of the medical condition or disease by addressing nutritional needs of the person being treated. "Treating" and "treatment" have grammatically corresponding meanings.

"Therapy" means treatment given or action taken to reduce or eliminate symptoms of a disease or pathological condition.

The HMOs can be isolated or enriched by well-known processes from milk(s) secreted by mammals including, but not limited to human, bovine, ovine, porcine, or caprine species. The HMOs can also be produced by well-known processes using microbial fermentation, enzymatic processes, chemical synthesis, or combinations of these technologies. As examples, using chemistry LNnT can be made as described in WO 2011/100980 and WO 2013/044928, LNT can be synthesized as described in WO 2012/155916 and WO 2013/044928, a mixture of LNT and LNnT can be made as described in WO 2013/091660, 2'-FL can be made as described in WO 2010/115934 and WO 2010/115935, 3-FL can be made as described in WO 2013/139344, 6'-SL and salts thereof can be made as described in WO 2010/100979, sialylated oligosaccharides can be made as described in WO 2012/113404 and mixtures of human milk oligosaccharides can be made as described in WO 2012/113405. As examples of enzymatic production, sialylated oligosaccharides can be made as described in WO 2012/007588, fucosylated oligosaccharides can be made as described in WO 2012/127410, and advantageously diversified blends of human milk oligosaccharides can be made as described in WO 2012/156897 and WO 2012/156898. Biotechnological methods which describe how to make core (non-fucosylated neutral) human milk oligosaccharides optionally substituted by fucose or sialic acid using genetically modified *E. coli* con be found in WO 01/04341 and WO 2007/101862.

The HMO may be a single HMO or a mixture of any HMOs suitable for the purpose of the invention.

In one embodiment, the mixture comprises, consists of or essentially consists of, neutral HMOs, preferably one or more fucosylated neutral HMOs. The mixture may include one or more core HMOs (also referred to as non-fucosylated neutral HMOs). Particularly, the mixture of HMOs may contain a fucosylated HMO selected from the list consisting of 2'-FL, 3-FL, DFL, LNFP-I, LNFP-II, LNFP-III, LNFP-V, LNDFH-I, LNDFH-II, LNDFH-III, FLNH-I, FLNH-II, FLNnH, FpLNH-I and F-pLNnH II. The mixture of HMOs may contain a core HMO selected from the list consisting of LNT, LNnT, LNH, LNnH, pLNH and pLNnH. More preferably, the mixture of neutral HMOs contains, consists of or essentially consists of, a fucosylated HMO selected from the list consisting of 2'-FL, 3-FL and DFL. The core HMO may be selected from the list consisting of LNT and LNnT: Advantageously the mixture comprises, consists of or essentially consists of, 2'-FL and DFL. The mixture may include at least one of LNnT and LNT.

In other embodiment, the mixture comprises, consists of or essentially consists of, at least a first (acidic) HMO. The first (acidic) HMO is preferably selected from the list consisting of 3'-SL, 6'-SL and FSL. The mixture may also include one or more fucosylated neutral HMOs and one or more core HMOs as described above. The one or more fucosylated neutral HMOs and one or more core HMOs may be selected from the list consisting of 2'-FL, 3-FL, DFL, LNT and LNnT; advantageously the mixture comprises, consists of or essentially consists of, 2'-FL and 6'-SL; or 6'-SL and at least one of 2'-FL and DFL; or 2'-FL, 6'-SL and at least one of LNnT and LNT; or 2'-FL, DFL, 6'-SL and at least one of LNnT and/or LNT.

In one embodiment, the synthetic composition can be in the form of a nutritional composition. For example, the nutritional composition can be a food composition, a rehydration solution, a medical food or food for special medical purposes, a nutritional supplement and the like. The nutritional composition can contain sources of protein, lipids and/or digestible carbohydrates and can be in powdered or liquid forms. The composition can be designed to be the sole source of nutrition or as a nutritional supplement.

Suitable protein sources include milk proteins, soy protein, rice protein, pea protein and oat protein, or mixtures thereof. Milk proteins can be in the form of milk protein concentrates, milk protein isolates, whey protein or casein, or mixtures of both. The protein can be whole protein or hydrolysed protein, either partially hydrolysed or extensively hydrolysed. Hydrolysed protein offers the advantage of easier digestion which can be important for pregnant women. The protein can also be provided in the form of free amino acids. The protein can comprise about 5% to about 30% of the energy of the nutritional composition, normally about 10% to 20%. Ideally the source of protein does not include excessive amounts of lactose.

The protein source can be a source of glutamine, threonine, cysteine, serine, proline, or a combination of these amino acids. The glutamine source can be a glutamine dipeptide and/or a glutamine enriched protein. Glutamine can be included due to the use of glutamine by enterocytes as an energy source. Threonine, serine and proline are important amino acids for the production of mucin. Mucin coats the GI tract and can improve intestinal barrier function and promote mucosal healing. Cysteine is a major precursor of glutathione, which is key for the antioxidant defences of the body.

Suitable digestible carbohydrates include maltodextrin, hydrolysed or modified starch or corn starch, glucose polymers, corn syrup, corn syrup solids, high fructose corn syrup, rice-derived carbohydrates, pea-derived carbohydrates, potato-derived carbohydrates, tapioca, sucrose, glucose, fructose, sucrose, honey, sugar alcohols (e.g. maltitol, erythritol, sorbitol), or mixtures thereof. Preferably the composition is reduced in or free from added lactose or other FODMAP carbohydrates. Generally digestible carbohydrates provide about 35% to about 55% of the energy of the nutritional composition. A suitable digestible carbohydrate is a low dextrose equivalent (DE) maltodextrin.

Suitable lipids include medium chain triglycerides (MCT) and long chain triglycerides (LCT). Preferably the lipid is a mixture of MCTs and LCTs. For example, MCTs can comprise about 30% to about 70% by weight of the lipids, more specifically about 50% to about 60% by weight. MCTs offer the advantage of easier digestion which can be important for pregnant women. Generally, the lipids provide about 35% to about 50% of the energy of the nutritional composition. The lipids can contain essential fatty acids (omega-3 and omega-6 fatty acids). Preferably these polyunsaturated fatty acids provide less than about 30% of total energy of the lipid source.

Suitable sources of long chain triglycerides are rapeseed oil, sunflower seed oil, palm oil, soy oil, milk fat, corn oil, high oleic oils, and soy lecithin. Fractionated coconut oils are a suitable source of medium chain triglycerides. The lipid profile of the nutritional composition is preferably designed to have a polyunsaturated fatty acid omega-6 (n-6) to omega-3 (n-3) ratio of about 4:1 to about 10:1. For example, the n-6 to n-3 fatty acid ratio can be about 6:1 to about 9:1.

The nutritional composition may also include vitamins and minerals. If the nutritional composition is intended to be a sole source of nutrition, it preferably includes a complete vitamin and mineral profile. Examples of vitamins include vitamins A, B-complex (such as B1, B2, B6, B9 and B12), C, D, E and K, niacin and acid vitamins such as pantothenic acid, folic acid and biotin. Examples of minerals include calcium, iron, zinc, magnesium, iodine, copper, phosphorus, manganese, potassium, chromium, molybdenum, selenium, nickel, tin, silicon, vanadium and boron.

The nutritional composition can also include a carotenoid such as lutein, lycopene, zeaxanthin, and beta-carotene. The total amount of carotenoid included can vary from about 0.001 µg/ml to about 10 µg/ml. Lutein can be included in an amount of from about 0.001 µg/ml to about 10 µg/ml, preferably from about 0.044 µg/ml to about 5 µg/ml of lutein. Lycopene can be included in an amount from about 0.001 µg/ml to about 10 µg/ml, preferably about 0.0185 µg/ml to about 5 µg/ml of lycopene. Beta-carotene can comprise from about 0.001 µg/ml to about 10 mg/ml, for example about 0.034 µg/ml to about 5 µg/ml of beta-carotene.

The nutritional composition preferably also contains reduced concentrations of sodium; for example, from about 300 mg/l to about 400 mg/l. The remaining electrolytes can be present in concentrations set to meet needs without providing an undue renal solute burden on kidney function. For example, potassium is preferably present in a range of about 1180 to about 1300 mg/l; and chloride is preferably present in a range of about 680 to about 800 mg/l.

The nutritional composition can also contain various other conventional ingredients such as preservatives, emulsifying agents, thickening agents, buffers, fibres and prebiotics (e.g. fructooligosaccharides, galactooligosaccharides), probiotics (e.g. *B. animalis* subsp. *lactis* BB-12, *B. lactis* HN019, *B. lactis* Bi07, *B. infantis* ATCC 15697, *L. rhamnosus* GG, *L. rhamnosus* HNOOI, *L. acidophilus* LA-5, *L. acidophilus* NCFM, *L. fermentum* CECT5716, *B. longum* BB536, *B. longum* AH1205, *B. longum* AH1206, *B. breve* M-16V, *L. reuteri* ATCC 55730, *L. reuteri* ATCC PTA-6485, *L. reuteri* DSM 17938), antioxidant/anti-inflammatory compounds including tocopherols, carotenoids, ascorbate/vitamin C, ascorbyl palmitate, polyphenols, glutathione, and superoxide dismutase (melon), other bioactive factors (e.g. growth hormones, cytokines, TFG-β), colorants, flavours, and stabilisers, lubricants, and so forth.

The nutritional composition can be formulated as a soluble powder, a liquid concentrate, or a ready-to-use formulation. The composition can be fed to a human in need via a nasogastric tube or orally. Various flavours and other additives can also be present.

The nutritional compositions can be prepared by any commonly used manufacturing techniques for preparing nutritional compositions in solid or liquid form. For example, the composition can be prepared by combining various feed solutions. A protein-in-fat feed solution can be prepared by heating and mixing the lipid source and then adding an emulsifier (e.g. lecithin), fat soluble vitamins, and at least a portion of the protein source while heating and stirring. A carbohydrate feed solution is then prepared by adding minerals, trace and ultra-trace minerals, thickening or suspending agents to water while heating and stirring. The resulting solution is held for 10 minutes with continued heat and agitation before adding carbohydrates (e.g. the HMOs and digestible carbohydrate sources). The resulting feed solutions are then blended together while heating and agitating and the pH adjusted to 6.6-7.0, after which the composition is subjected to high-temperature short-time processing during which the composition is heat treated, emulsified and homogenized, and then allowed to cool. Water soluble vitamins and ascorbic acid are added, the pH is adjusted to the desired range if necessary, flavours are added, and water is added to achieve the desired total solid level.

For a liquid product, the resulting solution can then be aseptically packed to form an aseptically packaged nutritional composition. In this form, the nutritional composition can be in ready-to-feed or concentrated liquid form. Alternatively, the composition can be spray-dried and processed and packaged as a reconstitutable powder.

When the nutritional product is a ready-to-feed nutritional liquid, it may be preferred that the total concentration of HMOs in the liquid, by weight of the liquid, is from about 0.1% to about 1.5%, including from about 0.2% to about 1.0%, for example from about 0.3% to about 0.7%. When the nutritional product is a concentrated nutritional liquid, it may be preferred that the total concentration of HMOs in the liquid, by weight of the liquid, is from about 0.2% to about 3.0%, including from about 0.4% to about 2.0%, for example from about 0.6% to about 1.5%.

In another embodiment, the nutritional composition is in a unit dosage form. The unit dosage form can contain an acceptable food-grade carrier, e.g. phosphate buffered saline solution, mixtures of ethanol in water, water and emulsions such as an oil/water or water/oil emulsion, as well as various wetting agents or excipients. The unit dosage form can also contain other materials that do not produce an adverse, allergic or otherwise unwanted reaction when administered to a human. The carriers and other materials can include solvents, dispersants, coatings, absorption promoting agents, controlled release agents, and one or more inert excipients, such as starches, polyols, granulating agents, microcrystalline cellulose, diluents, lubricants, binders, and disintegrating agents. Preferably, the unit dosage form comprises primarily HMOs with a minimum amount of binders and/or excipients. The unit dosage form may include additional nutrients such as long-chain polyunsaturated fatty acids and vitamins and minerals as described above. The unit dosage form may also include prebiotics and probiotics as described above. Unit dosage forms are particularly suitable when nutritionally incomplete or not intended as a sole source of nutrition.

A unit dosage form can be administered orally, e.g. as a tablet, capsule, or pellet containing a predetermined amount of the mixture, or as a powder or granules containing a predetermined concentration of the mixture or a gel, paste, solution, suspension, emulsion, syrup, bolus, electuary, or slurry, in an aqueous or non-aqueous liquid, containing a predetermined concentration of the mixture. An orally administered composition can include one or more binders, lubricants, inert diluents, flavouring agents, and humectants. An orally administered composition such as a tablet can optionally be coated and can be formulated to provide sustained, delayed or controlled release of the HMO.

A unit dosage form can also be administered by naso-gastric tube or direct infusion into the GI tract or stomach.

A unit dosage form can also include therapeutic agents such as antibiotics, probiotics, analgesics, and anti-inflammatory agents.

The proper dosage of a nutritional composition for a human can be determined in a conventional manner, based upon factors such as the concentration of HMOs, the woman's condition, immune status, body weight and age. In some cases, the dosage will be such that the HMOs are delivered at a concentration similar to that found in human breast milk. The required amount of HMOs would generally be in the range from about 1 g to about 15 g per day, in certain embodiments from about 2 g to about 10 g per day, for example about 3 g to about 7 g per day. Appropriate dose regimes can be determined by methods known to those skilled in the art.

In further embodiment, the HMO can be formulated as a pharmaceutical composition. The pharmaceutical composition can contain a pharmaceutically acceptable carrier, e.g. phosphate buffered saline solution, mixtures of ethanol in water, water and emulsions such as an oil/water or water/oil emulsion, as well as various wetting agents or excipients. The pharmaceutical composition can also contain other materials that do not produce an adverse, allergic or otherwise unwanted reaction when administered to a human. The carriers and other materials can include solvents, dispersants, coatings, absorption promoting agents, controlled release agents, and one or more inert excipients, such as starches, polyols, granulating agents, microcrystalline cellulose, diluents, lubricants, binders, and disintegrating agents.

The pharmaceutical compositions can be administered orally, e.g. as a tablet, capsule, or pellet containing a predetermined amount, or as a powder or granules containing a predetermined concentration or a gel, paste, solution, suspension, emulsion, syrup, bolus, electuary, or slurry, in an aqueous or non-aqueous liquid, containing a predetermined concentration. Orally administered compositions can include binders, lubricants, inert diluents, flavouring agents, and humectants. Orally administered compositions such as tablets can optionally be coated and can be formulated to provide sustained, delayed or controlled release of the mixture therein.

The pharmaceutical compositions can also be administered by rectal suppository, aerosol tube, naso-gastric tube or direct infusion into the GI tract or stomach.

The pharmaceutical compositions can also include therapeutic agents such as antibiotics, probiotics, analgesics, and anti-inflammatory agents. The proper dosage of a pharmaceutical composition can be determined in a conventional manner, based upon factors such the concentration of the HMO, the woman's condition, immune status, body weight and age. In some cases, the dosage will be such that the HMOs are delivered at a concentration similar to that found in human breast milk. The required amount of HMOs would generally be in the range from about 1 g to about 15 g per day, in certain embodiments from about 2 g to about 10 g per day, for example about 3 g to about 7 g per day. Appropriate dose regimes can be determined by methods known to those skilled in the art.

For promoting the development of a balanced immune system in an unborn infant, for promoting the normal development of the brain in an unborn infant, for promoting the development of a healthy gastrointestinal system in an infant later born to a pregnant woman, for reducing immune related disorders in an infant later born to the woman, for reducing neurodevelopmental disorders in an infant later born to the woman, and/or for reducing functional gastrointestinal disorders in an infant later born to the woman, the amount of HMO(s) required to be administered will vary depending upon factors such as the risk and severity of any underlying medical condition or disease, age, the form of the composition, and other medications being administered. Further the amount may vary depending upon whether the HMOs are being used prophylactically (when the dose may be higher) or whether the HMOs are being used in during maintenance (when the dose may be lower). However, the required amount can be readily set by a medical practitioner and would generally be in the range from about 1 g to about 15 g per day, in certain embodiments from about 2 g to about 10 g per day, for example from about 3 g to about 7 g per day. An appropriate dose can be determined based on several factors, including, for example, body weight and/or condition, other ailments and/or diseases, the incidence and/or severity of side effects and the manner of administration. Appropriate dose ranges may be determined by methods known to those skilled in the art. During an initial phase, the dosing can be higher (for example 3 g to 15 g per day, preferably 3 mg to 10 g per day). During a maintenance phase, the dosing can be reduced (for example, 1 g to 10 g per day, preferably 2 g to 7.5 g per day).

EXAMPLES

Example 1

Sixteen male (aged 9 weeks) and 48 female (aged 8 weeks) NC/Nga mice are housed in standard plastic cages in a temperature-controlled (23-28° C.) room with a dark period from 20.00 to 08.00 hours. The mice are allowed ad libitum access to food and water, and are fed either a synthetic diet prepared according to AIN-93G guidelines or the same diet supplemented with HMOs selected from 2'-FL, 2'-FL and DFL, LNnT, LNT, 3'-SL, 6'-SL and LNFP-I. The HMO is added to the standard diet at a concentration of 50 g HMO/kg diet at the expense of starch.

The mice are divided into seven groups: Group 1 receiving the standard diet, Group 2 receiving the diet supplemented with 2'-FL, Group 3 receiving the diet supplemented with 2'-FL and DFL in a ratio of about 85:15, Group 4 receiving the diet supplemented with LNnT, Group 5 receiving the diet supplemented with LNT, Group 6 receiving the diet supplemented with 3'-SL, Group 7 receiving the diet supplemented with 6'-SL, and Group 8 receiving the diet supplemented with LNFP1. Each group has two male and six female mice. Three females are mated to one male in one cage. Pregnant mice are housed individually and then monitored daily until delivery. Offspring are separated from dams on day 21.

Female offspring are then divided into groups of 6 mice each. To induce stable dermatitis in the offspring, two or three offspring in each group are housed in one cage together with two or three 13-week-old female NC/Nga mice with severe skin lesions. Fresh faeces are collected on days 14, 35 and 98 after birth for analysis of intestinal microbiota. At age 98 d, mice are anaesthetised and whole blood is drawn from the carotid artery, and serum samples stored. The right ear auricle of each mouse is excised, snap-frozen in liquid $N_2$, and stored.

The severity of AD-like skin lesions in mice is scored weekly for the presence of (1) flare haemorrhage, (2) oedema, (3) excoriation and erosion, and (4) incrustation and xerosis. For each of these symptoms, a score is assigned as follows: 0, no sign; 1, mild; 2, moderate; or 3, severe. The sum of the individual scores is taken as the dermatitis score. In addition, the frequency of scratching behaviour, such as scratching of the nose, ears and dorsal skin with the hind paws, is measured during a 10 min period in each mouse at age 91 d.

The results indicate that maternal feeding with HMOs significantly reduces the clinical skin severity score in offspring at ages 70, 77, 84, 91 and 98 d compared to the standard diet. Also, maternal feeding with HMOs significantly reduces frequency of scratching behaviour. Further the concentration of total IgG1 indicating Th2 response is lower in the mice whose mothers received HMOs.

Example 2

Healthy pregnant women aged 18-40 years with uncomplicated pregnancies and scheduled for vaginal delivery, are recruited for the study. Women are included if they are not beyond week 24 of gestation at recruitment and intend to breast feed. Women are excluded if they are suffering from an acute or chronic illness, chronic inflammatory bowel disease, and gestational diabetes, and if they are taking antibiotics or anti-inflammatory drugs, and if they regularly consume commercially available, prebiotic supplements. Neonates are excluded if delivered by caesarean section, for obvious malformation, perinatal asphyxia, clinical or laboratory signs of a neonatal or maternal infection at delivery, or if breast feeding is not initiated before leaving the hospital.

The women attend a screening visit where they are each given both written and oral information about the study, inclusion and exclusion criteria are checked and they are asked to sign an informed consent form. The women are given a faecal sampling kit and trained in its operation. Further the women are trained to complete a set of online questionnaires including the Bristol Form Stool Scale (BSFS), a bowel movement diary, the Gastrointestinal Symptom Rating Scale (GSRS), the PHQ-12 physical symptoms scale, the PH4 mental health scale, and the Health-Related Quality of Life (HRQOL) questionnaire. A trial commencement visit (visit 1) is scheduled to correspond to the $26^{th}$ week of pregnancy and the women instructed to complete the bowel movement and BSFS questionnaires daily until visit 1. They are also instructed to complete the other questionnaires online immediately before visit 1 and to take a faecal sample as close as possible to visit 1. The women are instructed to store the faecal samples in a freezer and to transported them in a frozen state.

At visit 1, inclusion and exclusion criteria are checked and 100 women are enrolled in the study. A physical examination is conducted and any questions or issues associated with the questionnaires are dealt with and the faecal samples are collected. Blood samples are collected for biomarker and immune studies and biobanking. The serum from the blood samples is transferred to cryotubes and stored at −80° C. The women are assigned to one of two groups; namely a placebo group and an intervention group. Women in the placebo group receive 30 days' supply of dextrose packaged in daily-dose stick packs each containing 5 g. Women in the intervention group receive 30 days' supply of human milk oligosaccharides also packaged in daily-dose stick packs each containing 5 g. The human milk oligosaccharides are a formulation of 2'-FL and DFL in a ratio of about 85:15 on a mass basis. The women are given another faecal sampling kit. The women are instructed that they will receive an email, text message or phone call about 21 days after visit 1 as a reminder to complete the various questionnaires online at about 28 days after visit 1.

Women completing the questionnaire within the required time are sent another 30 days of either the placebo or intervention product according to their group. The women are instructed that they will receive an email, text message or phone call about 21 days after dispatch of the product as a reminder to complete the various questionnaires online immediately prior to a second visit (visit 2) about 28 days after dispatch of the product. The women are also reminded to take a faecal sample as close to visit 2 as possible.

At visit 2, the women receive a physical examination and blood samples are collected for biomarker and immune studies and biobanking. The faecal samples are collected, and a further sampling kit is issued. The women are then provided product, either the placebo or intervention product, sufficient to enable them to consume a daily dose until delivery of their infant.

At delivery, maternal blood and cord blood is collected. Colostrum samples are collected during hospitalisation after childbirth. Anthropometric data (weight and length) of the infant are collected. The women are trained to complete an online questionnaire in the form of a daily diary capturing minutes of inconsolable crying per day, number of regurgitation episodes per day, number of bowel movements per day and stool consistency, according to the Brussels Infant and Toddler Stool Scale. The women are provided another 30 days of either the placebo or intervention product according to their group. The women are instructed that they will receive an email, text message or phone call about 21 days after leaving the hospital as a reminder to complete the infant questionnaire online prior to a third visit (visit 3) about 28 days after leaving the hospital. The women are also reminded to take a faecal sample of the infant faeces as close to visit 3 as possible.

At visit 3, the infants receive a physical examination and anthropometric data is recorded. The women provide a sample of breast milk. The faecal samples are collected, and a further sampling kit is issued. The women are then provided 30 days of product, either the placebo or intervention product. The women are instructed that they will receive an email, text message or phone call about 21 days after visit 3 as a reminder to complete the infant questionnaire online prior to 28 days after visit 3. Women completing the questionnaire within the required time are sent another 30 days of either the placebo or intervention product according to their group. The women are instructed that they will receive an email, text message or phone call about 21 days after dispatch of the product as a reminder to complete the various questionnaires online prior to a fourth visit (visit 4) about 28 days after dispatch of the product. The women are also reminded to take a faecal sample of the infant's faeces as close to visit 4 as possible.

At visit 4, the infants receive a physical examination and anthropometric data is recorded. The faecal samples are collected. The women provide a sample of breast milk. The intervention is completed at this visit.

The mothers and children return for a follow up visit (visit 5) at or about 1 year after the child's birth. The children receive a physical examination and anthropometric data is recorded. Medical history is recorded including incidences of allergies.

Analysis of the questionnaires indicates that the women consuming the intervention product have improved gastrointestinal symptoms as indicated by GSRS. Further they indicate improved bowel movement and faecal consistency, quality of life and perception of energy. The abundance of bifidobacteria is increased. Incidence and severity of allergies and infections is decreased.

The breast milk of women consuming the intervention product indicate higher concentrations of IgA and regulatory immune factors such as TGF-8, IL-10 and IL-27.

The infants of mothers consuming the intervention product indicate lower incidence and/or severity of functional gastrointestinal issues, atopic dermatitis and allergy symptoms.

Example 3

An amorphous powder containing 2'-FL and DFL in a ratio of about 85:15 is filled into 5 gram stick packs and the packs are sealed.

The invention claimed is:

1. A method comprising:
providing to a woman in pregnancy a composition comprising a predetermined dosage of from about 3 g to about 7 g per day of one or more human milk oligosaccharides (HMOs) chosen from the group consisting of 2'-fucosyllactose (2'-FL), difucosyllactose (DFL), 3-fucosyllactose (3-FL), lacto-N-fucopentaose I (LNFP-I), lacto-N-tetraose (LNT), lacto-N-neotetraose (LNnT), 3'-sialyllactose (3'-SL), 6'-sialyllactose (6'-SL), and combinations thereof, wherein at least one of the one or more HMOs is 2'-FL, the selected dosage of HMOs formulated to modulate the relative abundance of adult-type species of *Bifidobacterium* in the gut microbiota of the pregnant woman in response to consumption by the pregnant woman;
providing instructions to the woman to consume the predetermined dosage of the chosen HMOs during the pregnancy; and
in response to consumption of the composition by the pregnant woman during pregnancy, reducing a level of one or more atopic dermatitis symptoms experienced by infant during a predetermined period after birth relative to a median level of said symptoms being experienced during the predetermined period after birth by infants whose mothers did not consume HMOs in pregnancy.

2. The method of claim 1, wherein the chosen one or more HMOs further comprise:
DFL; and
at least one non-fucosylated neutral HMO selected from LNnT and LNT.

3. The method of claim 1, wherein the chosen one or more HMOs comprise 2'-FL and DFL in a ratio of about 85:15.

4. The method of claim 1, further comprising administering to the woman during a maintenance phase following the pregnancy, a total daily dosage administered of the chosen one or more HMOs of from about 2 g to about 5 g per day.

5. The method of claim 4, wherein the maintenance phase continues for a period of at least four weeks.

6. A method comprising:
providing to a woman in pregnancy a composition comprising a predetermined dosage of from about 3 g to about 7 g per day of one or more human milk oligosaccharides (HMOs) chosen from the group consisting of 2'-fucosyllactose (2'-FL), difucosyllactose (DFL), 3-fucosyllactose (3-FL), lacto-N-fucopentaose I (LNFP-I), lacto-N-tetraose (LNT), lacto-N-neotetraose (LNnT), 3'-sialyllactose (3'-SL), 6'-sialyllactose (6'-SL), and combinations thereof, wherein at least one of the one or more HMOs is 2'-FL, the selected dosage of the one or more HMOs formulated to effective to modulate the relative abundance of adult-type species of *Bifidobacterium* in the gut microbiota of the pregnant woman in response to consumption by the pregnant woman of the composition during the pregnancy;
providing instructions to the woman to consume the predetermined dosage of the chosen HMOs during pregnancy; and
in response to consumption of the composition by the pregnant woman during pregnancy, reducing a level of one or more gastrointestinal disorder symptoms being experienced by the infant during a predetermined period after birth relative to a median level of said symptoms being experienced during the predetermined period after birth by infants whose mothers did not consume HMOs in pregnancy.

7. The method of claim 6, wherein the chosen one or more HMOs comprise:
   DFL; and
   at least one non-fucosylated neutral HMO selected from LNnT and LNT.

8. The method of claim 6, wherein the chosen one or more HMOs comprise 2'-FL and DFL in a ratio of about 85:15.

9. The method of claim 6, further comprising administering to the woman during a maintenance phase following the pregnancy, a total daily dosage administered of the chosen one or more HMOs of from about 2 g to about 5 g per day.

10. The method of claim 9, wherein the maintenance phase continues for a period of at least four weeks.

11. A method comprising:
   providing to a woman in pregnancy a composition comprising a predetermined dosage of from about 3 g to about 7 g per day of one or more human milk oligosaccharides (HMOs) chosen from the group consisting of 2'-fucosyllactose (2'-FL), difucosyllactose (DFL), 3-fucosyllactose (3-FL), lacto-N-fucopentaose I (LNFP-I), lacto-N-tetraose (LNT), lacto-N-neotetraose (LNnT), 3'-sialyllactose (3'-SL), 6'-sialyllactose (6'-SL), and combinations thereof, wherein at least one of the one or more HMOs is 2'-FL, the selected dosage of the one or more HMOs formulated to modulate the relative abundance of adult-type species of *Bifidobacterium* in the gut microbiota of the pregnant woman in response to consumption of the composition by the pregnant woman;
   providing instructions to the woman to consume the predetermined dosage of the chosen HMOs during the initial administration phase beginning; and
   in response to consumption of the composition by the pregnant woman during pregnancy, reducing a level of one or more symptoms of infection being experienced by the infant during a predetermined period after birth relative to a median level of said symptoms being experienced during the predetermined period after birth by infants whose mothers did not consume HMOs in pregnancy.

12. The method of claim 11, wherein the chosen one or more HMOs further comprise:
   DFL; and
   at least one non-fucosylated neutral HMO selected from LNnT and LNT.

13. The method of claim 11, wherein the chosen one or more HMOs comprise 2'-FL and DFL in a ratio of about 85:15.

14. The method of claim 11, further comprising administering to the woman during a maintenance phase following the pregnancy, a total daily dosage administered of the chosen one or more HMOs of from about 2 g to about 5 g per day.

\* \* \* \* \*